June 22, 1937.   J. D. GIBSON   2,084,953
CORD HOLDING ATTACHMENT
Filed Aug. 3, 1936
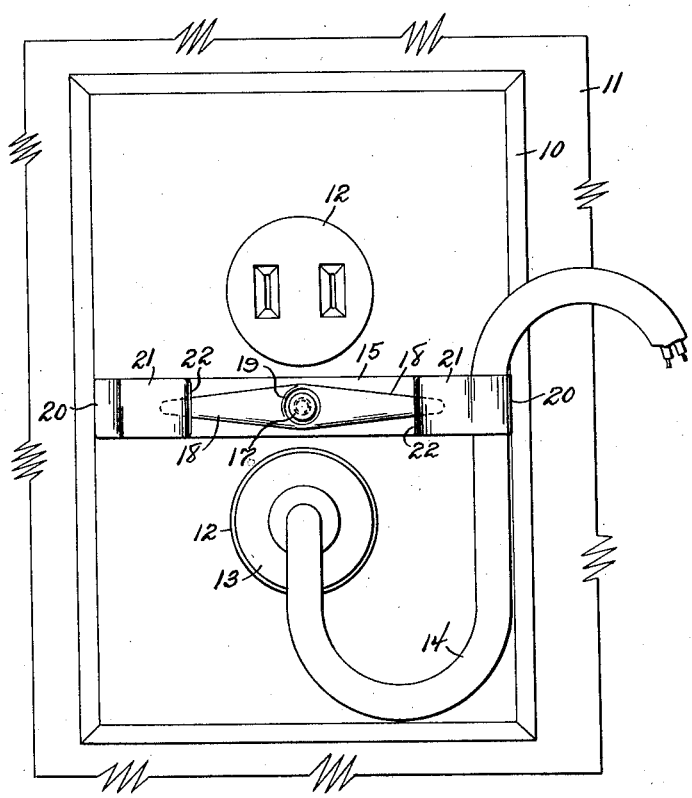
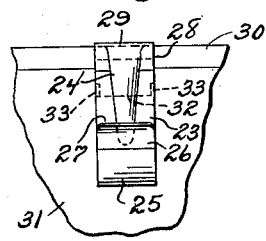
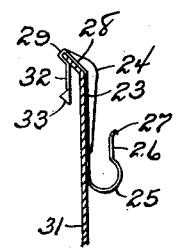
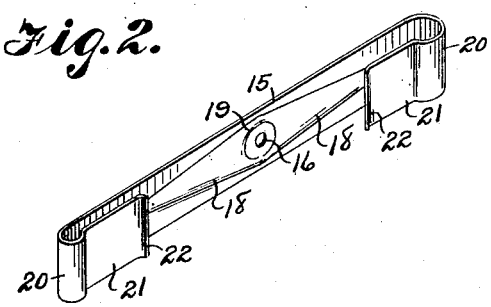
James D. Gibson
INVENTOR
BY Victor J. Evans & Co.
ATTORNEYS Patented June 22, 1937

2,084,953

UNITED STATES PATENT OFFICE 2,084,953

CORD HOLDING ATTACHMENT

James D. Gibson, Cleveland, Ohio

Application August 3, 1936, Serial No. 94,108

2 Claims. (Cl. 247—23)

This invention relates to cord holding attachments and has for an object to provide a clip adapted to be assembled with an outlet box and having a spring loop clamp adapted to receive an electric lamp cord or similar cord and anchor the same to the cover of the outlet box near a plug of the outlet so that pulling out of the pronged cap of the cord from the plug will be positively prevented.

A further object is to provide an electric cord holding attachment which may be formed from a single piece of spring metal, which will be stiffened longitudinally to resist yielding except at the spring loop, and which may be conveniently applied to outlet boxes and even to mouldings and other fixtures to hold the electric cord against being pulled loose by manipulation of the smoothing iron, toaster, or other appliance to which the cord is attached.

A further object is to provide a device of this character which may be formed by a single stamping operation, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a plan view of an outlet box equipped with a cord holding attachment constructed in accordance with the invention.

Figure 2 is a perspective view of the cord holding attachment shown in Figure 1.

Figure 3 is a plan view of a modified form of cord holding attachment.

Figure 4 is a longitudinal sectional view of the cord holding attachment shown in Figure 3.

Referring now to the drawing in which like characters of reference designate similar parts in the various views, 10 designates the cover of a conventional outlet box 11 having a pair of plugs 12 into which may be plugged the pronged cap 13 of a lamp cord 14 or other appliance cord.

In carrying out the invention an elongated narrow thin base strip 15 of spring metal is provided centrally with an opening 16 to receive a screw 17 which may be threaded into a suitable opening in the cover 10 between the plugs 12.

On opposite sides of the opening 16 the strip is deformed to provide substantially triangular stiffening ribs 18 which are rounded as shown at 19 at the bases so that the securing screw 17 may be countersunk between them.

Each end of the strip is provided with an arcuate spring loop 20 of sufficient diameter to receive the cord and the free end of the loop is lapped over the strip 15 in the direction of the central opening 16 therein to provide a guide lip 21 which extends parallel with the strip 15 and coacts with the strap in guiding the lamp cord accurately into the loop which thereupon yieldably clamps the cord against being pulled through the spring loop. The free end of the lip is curved outwardly as shown at 22 to promote easy entrance of the cord between the guide lip and the strip.

The strip 15 is secured to extend transversely across the cover 10 so that the spring loops 20 at the ends lie along the longitudinal sides of the cover. As a result either spring loop may be utilized to conveniently hold the cord 14 stationary upon the cover 10 so that the pronged cap 13 of the cord cannot be accidentally pulled out of the plug 12.

A modified form of the invention is shown in Figures 3 and 4 in which a single strip 23 of spring metal is provided with a longitudinally extending substantially triangular stiffening rib 24 and at one end of the strip there is formed a spring loop 25 adapted to receive the cord 14 and terminating in a guide lip 26 the free end 27 of which is bent outwardly to permit easy entrance of the cord between the guide lip and the strip into the loop 25 as previously described.

The opposite end of the strip 23 is provided with an offset extension 28 which terminates in a spring loop 29 adapted to embrace the flange 30 of the outlet box cover 31, this loop terminating in a spring tongue 32 having integral spurs 33 at the free ends to penetrate the woodwork, or in some instances, where the loop 29 is hooked over a fixture, these prongs may penetrate the plaster or any support upon which the fixture is mounted to firmly anchor the strip 23 from dislodgement.

From the above description it is thought that the construction and operation of the invention will be fully understood without further explanation.

What is claimed is:

1. The combination with an outlet box having a plurality of plugs for receiving pronged caps of electric cords, of a cord holder secured to the cover of the box to extend transversely there across between adjacent plugs, and open spring loops on the ends of the cord holder adapted to receive electric cords and anchor the same to the outlet box cover.

2. The combination with the cover of an outlet box, of a sheet metal clip having a central opening, stiffening ribs on the clip on opposite sides of the opening, spring loops on the ends of the clip for receiving electric cords, and a screw passed through said opening and threaded into an opening in the box cover.

JAMES D. GIBSON.